United States Patent

Kikuhara et al.

Patent Number: 5,081,760
Date of Patent: Jan. 21, 1992

[54] WORK ROLL FOR METAL ROLLING

[75] Inventors: Takashi Kikuhara; Osamu Shitamura; Yasuo Kondo, all of Katsuta, Japan

[73] Assignee: Hitachi, Ltd., Tokyo, Japan

[21] Appl. No.: 541,012

[22] Filed: Jun. 20, 1990

[30] Foreign Application Priority Data

Jun. 26, 1989 [JP]  Japan .................. 1-160783
Aug. 31, 1989 [JP]  Japan .................. 1-223297

[51] Int. Cl.$^5$ ............................... C21D 1/48
[52] U.S. Cl. ........................... 29/130; 29/32
[58] Field of Search .......... 29/130, 132; 148/16.5, 148/39

[56] References Cited

U.S. PATENT DOCUMENTS 4,000,010 12/1976 Sekimoto et al. .................. 29/132
4,191,599 3/1980 Stickels et al. .................... 29/132

FOREIGN PATENT DOCUMENTS 3643257 7/1988 Fed. Rep. of Germany ........ 29/132
0129757 7/1984 Japan ................................. 29/132
0153869 9/1984 Japan ................................. 29/132
1159552 7/1986 Japan ................................. 29/132

Primary Examiner—Irene Cuda
Attorney, Agent, or Firm—Antonelli, Terry, Stout & Kraus

[57] ABSTRACT

A compound roll for a metal rolling mill having both excellent resistance to a thermal shock crack and excellent wear resistance includes a core shaft made of low alloy steel and an outer layer consisting of high speed tool steel having a composition, by weight percent, essentially of 0.5 to 1.5% of C, 0.5 to 3.0% of Si, 1.5% or less of Mn, 2 to 7% of Cr, 1 to 5% of Mo, 0.5 to 2.0% of V, up to 2.0% of W and balance essentially Fe. The outer layer is formed on the outer surface of the core shaft by an electro-slag method. The outer layer is subjected to a water jet spray quenching and tempering at 300° C. or higher, preferably 450° C. to 550° C.

9 Claims, 6 Drawing Sheets

F I G. 1
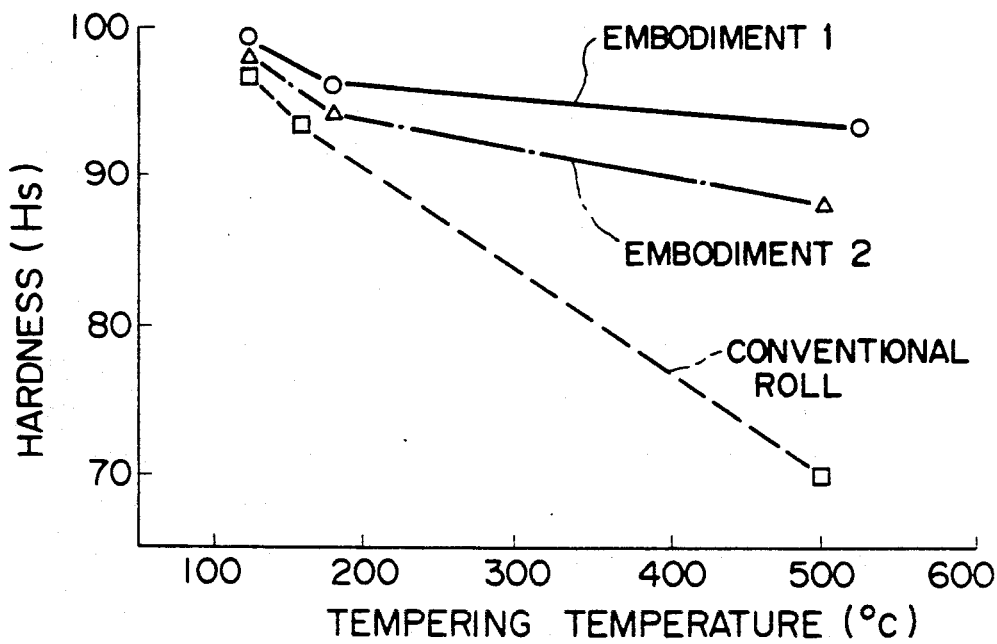
F I G. 2
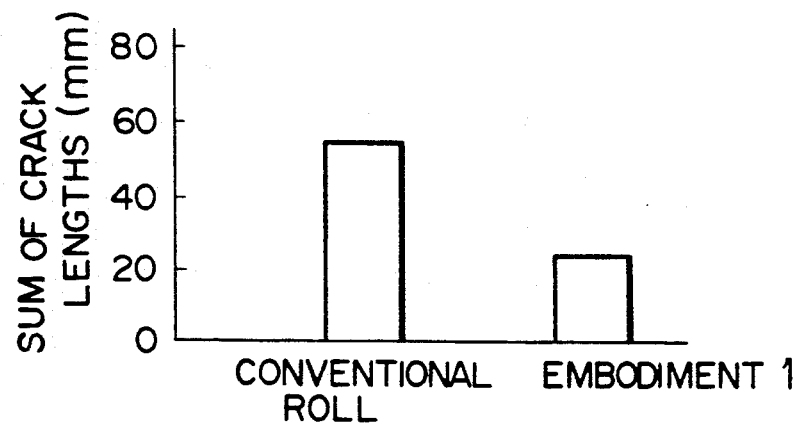

WORK ROLL FOR METAL ROLLING

BACKGROUND OF THE INVENTION

The present invention relates to a work roll for a metal rolling mill and a manufacturing method therefor, and, more particularly, to a work roll for a shift type 6-high rolling mill having great shaft strength and which can thereby be suitably used for cold metal rolling and a manufacturing method therefor.

In a roll for a metal rolling mill, the roll surface is subjected to a thermal shock due to a slip taking place between the roll and a material to be rolled during the rolling operation or due to an accident in which the material to be rolled is wound to the roll. If the thermal shock is too large, cracks are generated on the surface of the roll.

The resistance of the roll to the thermal shock can be effectively improved by conducting tempering at a high temperature in the heat treatment to be applied to the roll surface, that is, in the quench-and-temper process.

A conventional work roll is disclosed in, for example, Japanese Patent Unexamined Publication No. 63-60258, wherein the work roll has a composition consisting of 1.2 to 2.5% of carbon, 0.8 to 3.0% of silicon, 1% or less of manganese, 3.0 to 6.0% of chromium and 0.2% or less of molybdenum is subjected to the quench-and-temper process. In the above-described process, in order to obtain Shore hardness (Hs) 93 or more, the tempering temperature has been arranged to be 160° or lower. In this case, if the tempering temperature is higher than 160° C. for the purpose of improving the heat resistance and thermal shock resistance, the hardness exceeding Hs 93 cannot be obtained and the wear resistance deteriorates. As a result, the rolling becomes unsatisfactory.

SUMMARY OF THE INVENTION

Accordingly, an object of the present invention is to provide a work roll for a metal rolling mill exhibiting both excellent resistance to a thermal shock and wear resistance.

The above-described object can be achieved by a work roll for a metal rolling mill wherein the outer surface of a core shaft is covered with a different type outer layer material, with the work roll comprising a core shaft made of low alloy steel, and a outer layer material made of high speed tool steel having a composition consisting, by weight percent, essentially of:

carbon . . . 0.5 to 1.5%
   silicon . . . 0.5 to 3.0%
   manganese . . . 1.5% or less
   chromium . . . 2 to 7%
   molybdenum . . . 1 to 5%
   vanadium . . . 0.5 to 2.0%
   tungsten . . . up to 2.0%
   balance . . . essentially iron; and at least the outer surface portion of the outer layer being quenched and tempered and consisting essentially of a martensitic structure including 15% by volume or less of a residual austenite so that a residual compression stress exists at least in an outer surface portion of the outer layer, and the outer layer has a high surface hardness.

In accordance with the present invention, a method of manufacturing a work roll for a metal rolling mill having an outer surface of the core shaft thereof is covered with a different outer layer material, the method comprises the steps of:

(a) forming the outer layer having a composition consisting, by weight percent, essentially of
   carbon . . . 0.5 to 1.5%
   silicon . . . 0.5 to 3.0%
   manganese . . . 1.5% or less
   chromium . . . 2 to 7%
   molybdenum . . . 1 to 5%
   vanadium . . . 0.5 to 2.0%
   tungsten . . . up to 2.0%
   balance . . . essentially iron;

(b) heating at least the entire surface of the outer layer and at most only the outer layer up to a level exceeding a transformation temperature;

(c) subjecting a portion which has been thus heated to a quenching process by a water jet spray quenching; and (d) performing tempering at 300° C. or higher.

It is preferable that hot forging treatment be applied to the outer layer after the outer layer made of high speed tool steel is formed on the outer surface of the low alloy steel core shaft, the hot forging treatment being applied for the purpose of dispersing carbides contained in the outer layer and uniforming the structure.

The roll according to the present invention is a compound roll comprising a core shaft and an outer layer covering the core shaft. If the overall body is made of the high speed tool steel (that is, an integrated roll made of the high speed tool steel), there is a possibility of internal fracture (generation of a crack) due to thermal stress generated at the time of the water-spray quenching. Furthermore, since the shaft has poor toughness, the neck of the roll can be easily broken during the operation. Therefore, the compound structure roll is employed.

As for quenching, if air blast cooling or oil cooling is employed, satisfactory compression residual stress cannot be obtained even if the above-described material is used. That is, it is difficult to obtain a hardness exceeding Hs 93 when the tempering at 300° C is performed after the quenching. Thus, the water jet spray cooling is employed so as to perform the quenching according to the present invention. It is preferable that the tempering temperature be 450° C. to 550° C., further preferably, 500° C. to 550° C. In the case of a roll for cold rolling, it is required generally that the surface hardness is about Hs or 90 or more, while the surface hardness is generally arranged to be about Hs 85 in the case a roll for hot rolling.

The residual stress in the case according to the present invention in which only the outer layer portion is heated up to a level exceeding its transformation temperature and the quenching is performed by the rapid cooling becomes the resultant of the residual stress due to the thermal stress and that due to the transformation stress. If the outer layer is rapidly cooled, compression plastic strain is generated in the internal plastic deformation temperature region due to the volume contraction. As a result, compression residual stress is generated in the outer layer portion, while tensile residual stress is generated in the internal portion if the cooling is performed so as to make both the inner and the outer portions the same temperature, that is the residual stress due to the thermal stress. Furthermore, since the martensite generated in the outer layer portion due to the transformation has a relatively large specific volume, tensile residual stress is generated in the core shaft portion, while compression residual stress is generated in the hardened outer layer portion due to the difference in the specific volume from that of the core shaft portion. As described above, the residual stress generated due to the thermal stress and the transformation stress is considerably larger than the residual stress (in usual it is about $-20$ kg/mm$^2$) due to only the martensitic transformation. Therefore, the compression residual stress of $-70$ kg/mm$^2$ to $-120$ kg/mm$^2$ (in the case where a subzero treatment is conducted) according to the present invention can be obtained.

Since about 40% of austenite remains after only the water jet spray quenching has been performed, a subzero treatment at $-50°$ C. or lower is performed for the purpose of promoting the decomposition of the residual austenite. The subzero treatment is performed in such a manner that the roll is suspended in a vertical type subzero treatment tank and liquid nitrogen is sprayed to the surface of the roll with rotating the suspended roll. The quantity (or proportion) of the residual austenite becomes about 15% or less after the subzero treatment has been performed.

The quantity of the residual austenite can be reduced by several percent from the above-mentioned value of about 15% when tempering at 300° C. or higher is then performed. The finally residual austenite serves as a buffer for relaxing the thermal expansion and contraction of the roll surface during the operation of the roll so that the generation of the cracks in the roll surface is prevented. Furthermore, the tempering of the roll at high temperature will effectively prevent the generation of cracks due to the decomposition of the residual austenite in the roll surface if the hot steel plate winds around the roll by an accident and the temperature of the roll is raised in the case where the roll is used in a hot rolling operation.

In general, it has been known that the temperature of the tempering is proportional to the degree of relaxation of strain due to quenching and the quantity of reduction in the residual stress can be enlarged. However, the high speed tool steel according to the present invention contains Si, Cr, Mo, V and the like which are the alloying elements which improve the tempering resistance. Therefore, the strain cannot be excessively relaxed by the tempering at about 500° C. in comparison to an ordinary low alloy steel. As a result, large residual stress can be maintained.

It is preferable that the core shaft according to the present invention is made of low alloy steel displaying the tensile strength of 60 kg/mm$^2$ or more and impact value of 1.5 kg-m/cm$^2$ or more, further preferably, forging steel containing, by weight percent, 0.5 to 1.0% of carbon, 1% or less of silicon, 1% or less of manganese, 1 to 5% of chromium and 0.5% or less of molybdenum.

Other and further objects, features and advantages of the invention will be appear more fully from the following description.

BRIEF DESCRIPTION OF THE DRAWINGS

FIG. 1 is a graphical illustration of the relationship between the tempering temperature and the hardness of the roll according to the present invention and that of a conventional roll;

FIG. 2 is a graphical illustration of results of a comparison made between the thermal shock resistance of the roll according to the present invention and that of the conventional roll;

DETAILED DESCRIPTION OF THE INVENTION

Figure 3:
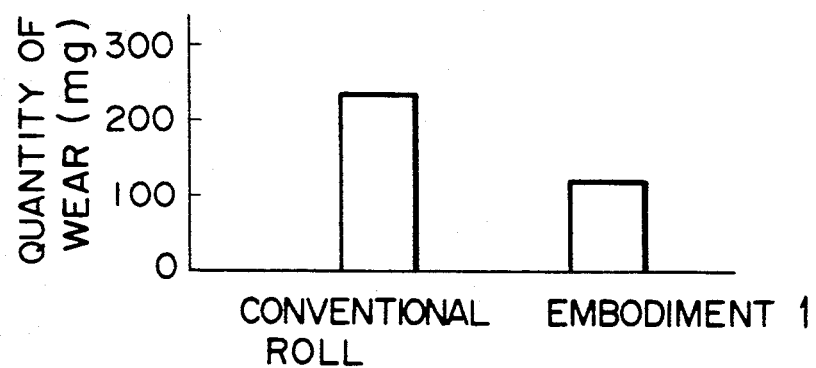
FIG. 3 is a graph which illustrates the results of a comparison made between the wear resistance of the roll according to the present invention and that of a conventional roll.

A work roll for rolling of the present invention is able to sufficiently exhibit excellent performance in terms of its wear resistance, resistance to surface roughness and toughness even if it is used in a rolling process in which large bending force is applied. In particular, in a work roll the outer layer of which is welded to the core shaft by an electro-slag remelting method, carbides crystalized from molten bath can be finely and uniformly dispersed in the outer layer since its levitation, sedimentation and segregation are prevented by the rapid solidification of the molten bath. As a result, the shape of the material to be rolled can be precisely controlled under high pressure and the surface quality of the rolled material can be assured.

It is required that the outer layer is made of high speed tool steel and is subjected to a heat treatment so as to have hardness exceeding Hs 90 in order to secure wear resistance and resistance to rough surface.

The reason for the arrangement of the chemical composition of the high speed tool steel forming the outer layer lies in that:

Carbon is necessary to form the carbides and to secure the hardness of the matrix for the purpose of improving the wear resistance. If the quantity of it is less than 0.5%, the quantity of the carbides becomes insufficient, causing the wear resistance to become unsatisfactory. If the same exceeds 1.5%, the quantity of network carbides precipitated in the grain boundary is increased, causing resistance to surface roughness and toughness to become insufficient. In particular, it is preferable that the quantity of it be 0.8 to 1.2%.

Silicon is an element which is necessary to serve as a deoxidizer. Silicon must be contained by 0.5% or more and silicon improves the resistance to tempering. However, the content exceeds 3.0%, brittleness easily takes place. It is preferable that the content is 1 to 3%, further preferably, 1.5 to 2.5%.

Manganese has a deoxidation effect and as well acts to fix sulfur in the form of MnS. If the content exceeds 1.5%, the quantity of retained austenite increases. As a result, it becomes difficult to maintain the sufficient hardness and the toughness deteriorates. It is preferable that the content is 0.2 to 1.0%, further preferably, 0.2 to 0.5%.

If the content of chromium is less than 2%, the quenching facility deteriorates. If it exceeds 7%, the quantity of chromium carbides becomes too large. It is preferable that the content be 3 to 6%, further preferably 3.5 to 5%.

Molybdenum and tungsten are respectively combined to carbon so that $M_2C$ or $M_6C$ carbides are generated. Furthermore, molybdenum and tungsten can be held in solid solution in the matrix so that the matrix is strengthened. As a result, wear resistance and resistance to tempering can be improved. However, if the content of it becomes too large, the quantity of $M_6C$ carbides is enlarged, causing both toughness and resistance to surface roughness to be deteriorated. The upper limit for molybdenum and tungsten must be 5% and 2%, respectively and molybdenum must be contained by 1% or more. It is preferable that the content of molybdenum is 1.5 to 4.5%. It is preferable that the content of tungsten is 0.1 to 1%, further preferably 0.15 to 0.5%.

Vanadium forms MC carbides and thereby contributes to improve wear resistance. It the content of it is less than 0.5%, a sufficient effect cannot be displayed. If it exceeds 2%, the machinability is excessively hindered. It is preferable that the content is 0.7 to 1.5%.

Cobalt is an element which can be held in solid solution in the matrix so as to obtain great hardness by high temperature tempering. The effect from it becomes sufficient even if the quantity is small: less than 5%.

The high speed tool steel employed to form the outer layer according to the present invention may contain nickel in addition to the above-described elements. Since nickel has an effect to improve the quenching facility, it may be contained by 5% or less. If the content of it exceeds the above-mentioned quantity, the quantity of the retained austenite is enlarged, causing hardness or resistance to surface roughness to be deteriorated. It is preferable that the content be 1% or less, further preferably 0.1 to 0.5%.

The balance is essentially constituted by iron except for impurities.

It is preferable that forging steel having an Hs value exceeding 35 be used as the material for the core shaft according to the present invention. When a neck stress of 10 kg/mm² is, as the nominal stress, added to the roll according to the present invention, the necessary fatigue limit becomes 36 kg/mm² assuming that size effect factor is 0.8, surface finish effect factor is 0.9 and notch factor is 2.0. Therefore, it is preferable that the hardness to obtain the above-described value be Hs 35 or more.

The nominal stress $\sigma_n$ at the roll neck portion can be obtained from the following equation:

$$\sigma_n = \frac{M}{Z} = P \cdot l / \left(\frac{\pi d^3}{32}\right) \tag{1}$$

where
M: bending moment
Z: cross sectional coefficient $$\left(\frac{\pi d^3}{32}\right)$$

P: load applied to the bearing
l: moment arm from the center of the bearing
d: diameter of the shaft Furthermore, allowable stress $\sigma_{al}$ can be obtained from the following equation:

$$\sigma_{al} = \sigma_{wo} \cdot \frac{\eta \cdot \zeta}{\beta} \cdot \frac{1}{S} \tag{2}$$

where
$\sigma_{wo}$: two rotational bending fatigue limit of smooth test piece
$\eta$: size effect factor = 0.8
$\zeta$: surface finish effect factor = 0.9
$\beta$: notch factor = 2.0
S: safety ratio = 1.3

If $\sigma_{al} \geq \sigma_n$, it can be considered safety. Therefore, the following relationship can be obtained from Equations (1) and (2):

$$\sigma_{wo} \geq \frac{\beta}{\eta \cdot \zeta} \cdot S \cdot \sigma_n$$

If on $\sigma_n = 10$ kg/mm², $\sigma_{wo} \geq 36$ kg/mm².

A method of forming the outer layer on the core shaft can be exemplified by a continuous overlaying method utilizing high frequency heating as disclosed in Japanese Patent Examined Publication No. 44-4903, a method for forming the outer layer by isotropic hot pressing with powder metallurgy method employed as disclosed in, for example, Japanese Patent Unexamined Publication No. 47-2851 and an overlaying method as disclosed in Japanese Patent Unexamined Publication No. 57-2862 in which an electroslag remelting method is employed.

Then, an example of manufacturing the roll according to the present invention by utilizing the recommended electroslag re-melting overlaying method will be described.

Figure 7:
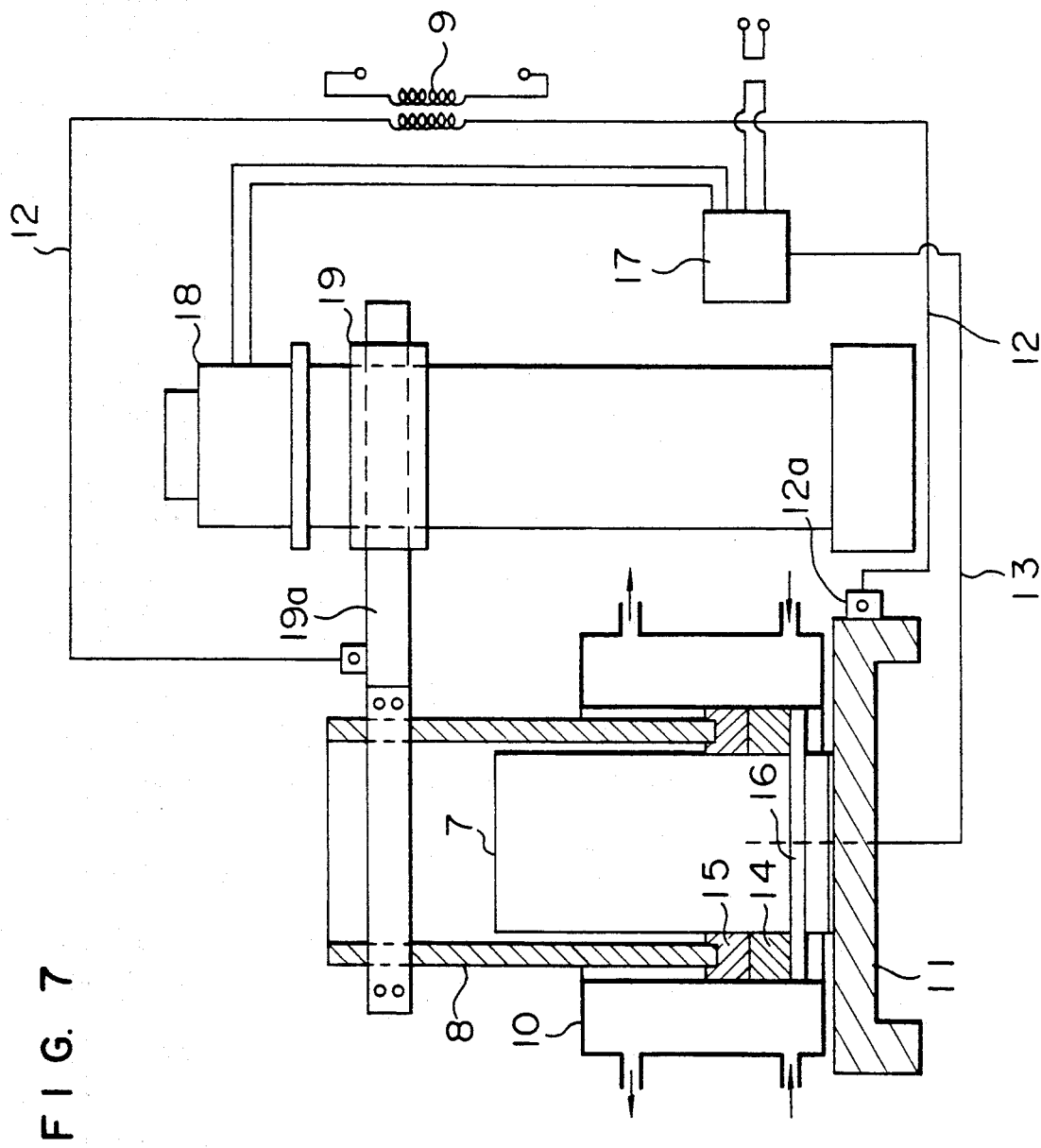
FIG. 7 is a schematic view of a compound roll manufacturing apparatus on the basis of an electro-slag overlaying method.

For manufacturing a compound roll by utilizing the electro-slag overlaying method, as shown in FIG. 7, and is provided which apparatus comprises a welding machine 9, an amplifier 17, power supply cable 12, a carbon brush 12a, a temperature measuring thermocouple 13, a DC motor 18 and a manipulator 19. The manipulator 19 is operated by the DC motor 18 so that a tubular electrode, which is a consumable electrode made of a high speed tool steel and supported by a manipulator arm 19a, is in an upward direction moved. A core shaft 7, of low alloy steel, is disposed on a molding board 11. A water cooling mold 10 is concentrically disposed with the core shaft 7 and an annular bottom plate 16 (that is, a mold bottom) is disposed close the lower end portion of the core shaft 7, the annular bottom plate 16 being disposed in a space formed between the core shaft 7 and the water cooling mold 10. The core shaft 7 and the water cooling mold 10 are arranged so as to rotate in the circumferential direction. The tubular electrode 8 supported by the manipulator 19 is inserted into the space defined by the core shaft 7 and the water cooling mold 10, that is, is inserted into a melting chamber. As a result, the tubular electrode 8 is melted and consumed by an electric current supplied, via the cable 12, to the space between the core shaft 7 and the tubular electrode 8. When arc is generated due to the supply of the electric current, a slag 15 is melted due to resistance heat, and, simultaneously, a molten metal 14 is formed, with the molten metal 14 being cooled as a result of the contact with the water cooling mold 10 so that it is solidified. As a result, an overlaid layer is formed on the surface of the core shaft 7. During the above-described process, the water cooling mold 10 is upwards moved upwardly and concentrically with the core shaft 7. The slag 15 is adjusted so as to always have the thickness of 50 to 60 mm. The downward dripping of the molten metal 14 is prevented by the annular bottom plate 16.

The thus obtained overlaid layer of the combined roll is forged and the overlaid layer is subjected to a quench-and-temper process. As a result, an overlaid layer having the surface hardness Hs 90 or more can be obtained.

Figure 8:
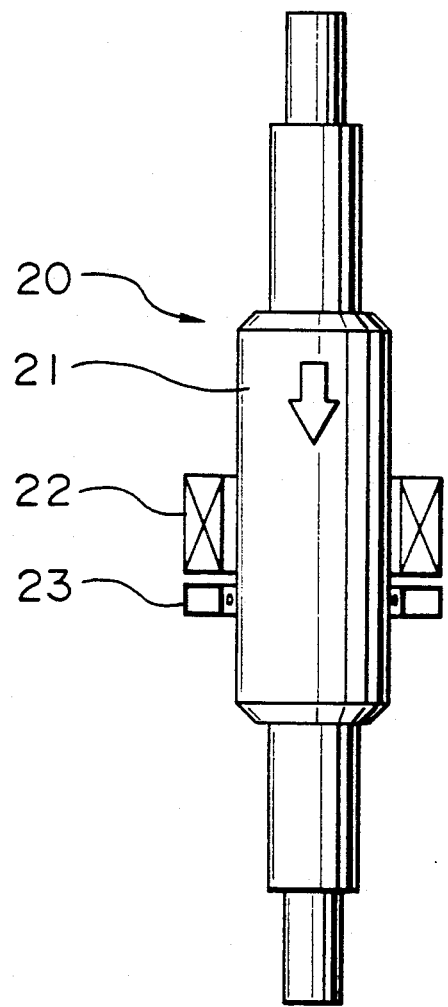
FIG. 8 is a schematic view which illustrates a method of water jet spray quenching the roll.

FIG. 8 illustrates a method of water jet spray quenching, as shown in FIG. 8, an outer layer 21, forming the overlaid layer of the roll 20 is the portion to be quenched. An annular device comprising an induction coil 22 and a water jetting cylinder 23 is disposed so as to surround an outer layer 21 of a roll 20 disposed vertically. The roll 20 is moved in a downward direction and rotated in a state where a low frequency current is being passed through the induction coil 22. The outer layer 21 is successively cooled by water injected from the water jetting cylinder 23 with heated by the generated induction current. As a result, a rapid cooling at a speed 10° C./sec or more can be performed.

A roll arranged to have the drum diameter of 385 mm and the drum length of 1480 mm was manufactured on the basis of the electro-slag remelting method by the above-described apparatus by using a shaft material the diameter of which was 300 mm. The outer diameter of the outer layer after the overlaid outer layer was 485 mm. Then, the outer diameter of it was made 415 mm and the thickness of the outer layer was made 42.5 mm by forging process at 1100° C. (forging ratio: 1.3). Then, the surface of the outer layer was cut so as to make the diameter of the outer layer larger than the finish outer diameter 385 mm by about 2 to 3 mm.

The chemical composition of the material of the outer layer is shown in Table 1 (weight percent). The roll thus manufactured was further subjected to a heat treatment comprising the steps of quenching at 1000° C. to 1200° C. and tempering at 120° to 520° C. for 10 to 20 hours. A comparative roll having the same dimensions was manufactured by using a conventional 5%-Cr forging steel. Also the chemical composition of this material is shown in Table 1. The comparative roll was subjected to a proper heat treatment. A forging steel, the composition of which was carbon is 0.9% and chromium is 3% was employed to make the shaft material for the roll according to the present invention, with the material having the hardness of Hs 40.

TABLE 1

|  | C | Si | Mn | Cr | Mo | V | W |
|---|---|---|---|---|---|---|---|
| Embodiment 1 | 0.92 | 2.39 | 0.30 | 4.14 | 2.22 | 1.00 | 0.31 |
| Embodiment 2 | 0.91 | 0.79 | 0.33 | 4.08 | 2.31 | 1.04 | 0.33 |
| Conventional Roll | 0.91 | 0.62 | 0.38 | 4.68 | 0.43 | 0.08 | — |

Figure 6:
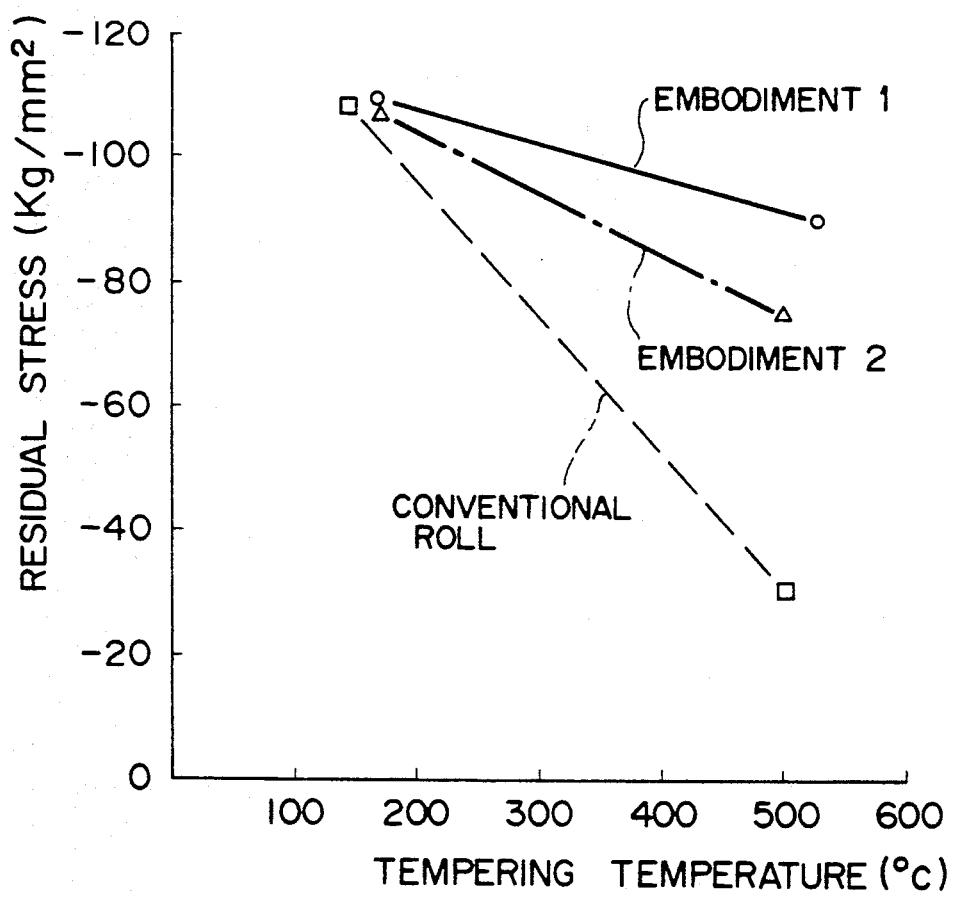
FIG. 6 is a graphical illustration of the relationship between the tempering temperature and the residual stress of the roll according to the present invention and that of the conventional roll.

FIG. 1 illustrates the relationship between the tempering temperature and hardness, while FIG. 6 illustrates the relationship between the tempering temperature and the residual stress. According to Embodiments 1 and 2 of the present invention, the quenching temperature was 1060° C., and only the outer layer was subjected to low frequency induction heating by the method shown in FIG. 8. Then, it was subjected to gradual quenching (at a cooling speed faster than 10° C./sec) by water jet spray cooling. Then, it was subjected to a subzero treatment at −50° C. and tempered at each of temperatures.

From a comparison made between FIGS. 1 and 6, it is apparent that the residual stress contributes to the hardness of the roll surface after the tempering. According to the conventional roll, the tempering at 160° C. gives the hardness of Hs 93. However, according to Embodiment 1, the same hardness was obtained by tempering at 520° C. As is shown from this, the tempering temperature from which the same hardness can be obtained is significantly raised in comparison to the conventional roll. Furthermore, the residual stress at the surface of the roll according to Embodiments 1 and 2 at the tempering temperature of 500° C. was larger than −70 kg/mm$^2$. On the other hand, the residual stress at the surface of the conventional roll was about −30 kg/mm$^2$. As is shown from this, a larger residual stress can be secured according to the present invention.

According to Embodiment 2, the hardness after the tempering at 500° C. was Hs 88. A significant effect of the addition of Si can be obtained.

FIG. 2 illustrates the results of a comparison made between the thermal shock resistance according to Embodiment 1 and that according to the conventional roll. The test was carried out in such a manner that materials were taken from the surface of the forged roll surface. After the materials have been machined, they were quenched, and the roll according to the present invention was tempered at 520° C., while the conventional roll was tempered at 160° C. before subjected to the test. The test conditions were as follows: test pieces the diameter of each of which was 80 mm and the thickness of each of which was 40 mm were rotated at 1420 rpm, and the water cooling was performed with a soft steel material of 20 mm square abutted against the test pieces respectively at a load of 500 g/mm.

The crack length designated by the axis of ordinate shows the total length of the cracks generated on the surface of the test piece. The crack length according to the conventional material was 54 mm, while that according to the present invention was 23 mm which was less than the half of the result of the conventional material. Therefore, it is apparent that a significant effect can be obtained from the high temperature tempering.

FIG. 3 illustrates the results of a comparison made about the wear resistance. The test was carried out in such a manner that test pieces the diameter of the moving surface of each of which was 18 mm were subjected to similar heat treatments and were moved on #100 emery paper with a load of 500 g added. The quantity of wear of the conventional roll was 230 mg, while that of the present invention was 120 mg. It is apparent that the roll according to the present invention displays excellent wear resistance.

Figure 4:
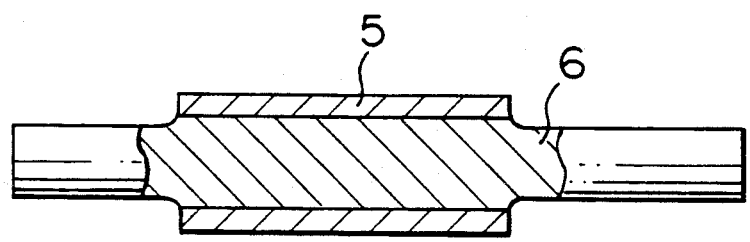
FIG. 4 is a cross sectional view of a portion of a work roll according to the present invention.
Figure 5:
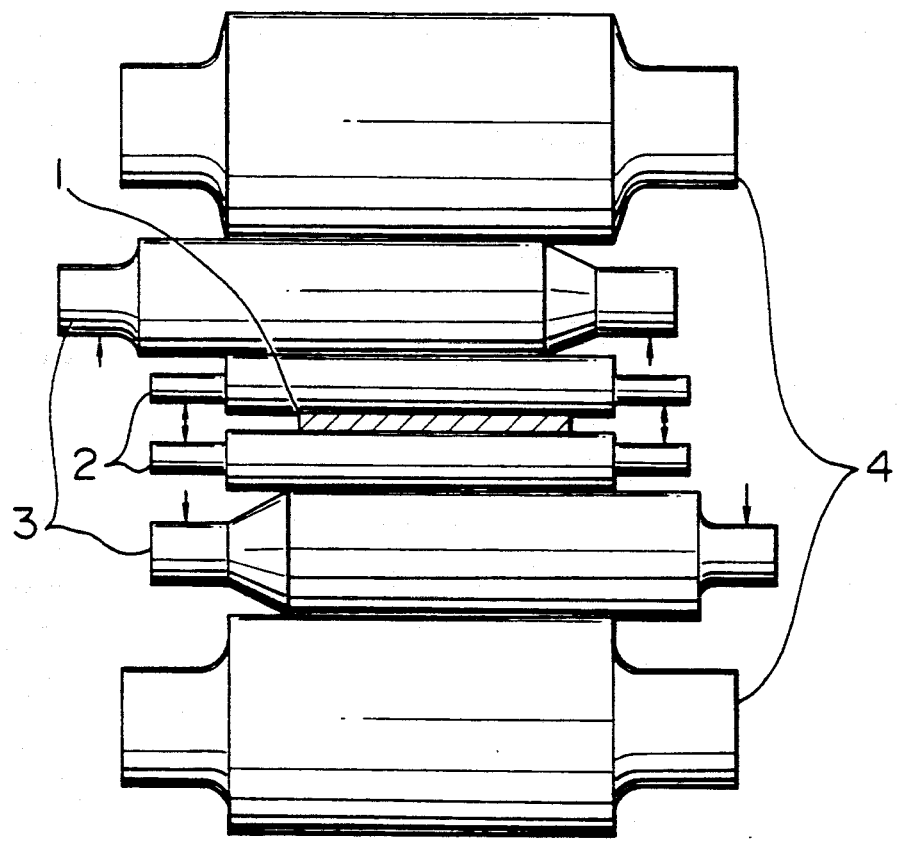
FIG. 5 is a front elevational view of a cold strip mill employing the work roll according to the present invention.

As a roll according to the present invention, a roll formed as shown in FIG. 4 was manufactured and this roll was used to perform cold rolling of stainless steel foil and a sheet steel for tin plating the thickness each of which was sub-milimeters, in particular 200 μm or less. As a result, the roll according to the present invention displayed excellent wear resistance of five or more times the conventional integrated type roll. Referring to the drawing, reference numeral 1 represents a material to be rolled, 2 represents the work roll according to the present invention, 3 represents an intermediate roll, 4 represents a backup roll, 5 represents the outer layer and 6 represents a core material.

As will be apparent from the above, according to the present invention, tempering can be performed at a high temperature of 300° C. or more even if the surface temperature is the same as that of the conventional roll. Therefore, durability against a thermal shock generated due to the slip or an accident at the time of the rolling operation can be significantly improved with the wear resistance equivalent to that of the conventional roll maintained.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A work roll for a metal rolling mill comprising a core shaft of a low alloy steel, and an outer layer covering an outer surface of said core shaft, wherein said outer layer is of a high alloy steel consisting, by weight percent, essentially of C 0.5 to 1.5%, Si 0.5 to 3.0%, Mn 1.5% or less, Cr 2 to 7%, Mo 1 to 5%, V 0.5 to 2.0%, W up to 2.0% and a balance Fe except for impurities; and wherein at least an outer surface portion of the outer layer is quenched and tempered and consists essentially of a martensitic structure including 15% by volume or less of residual austenite, and wherein a residual compression stress exists in the outer surface portion of said outer layer, with said outer layer having a high surface hardness.

2. A work roll according to claim 1, wherein the high alloy steel further comprises 5% by weight or less Ni.

3. A work roll according to claim 1, wherein said outer layer is formed by an overlay welding process.

4. A work roll according to claim 1, wherein said residual compression stress is 70 kg/mm$_2$ or more.

5. A work roll according to claim 1, wherein the surface hardness of the outer layer is Hs 85 or more.

6. A work roll according to claim 1, wherein at least the outer surface portion of the outer layer is quenched by a water spray quenching process.

7. A work roll according to claim 1, wherein a tempering of the outer layer is effected at a temperature of 450° C. to 550° C.

8. A work roll according to claim 1, wherein the outer layer is formed by a hot forging process.

9. A work roll according to claim 3, wherein the outer layer is hot forged.

* * * * *